Patented Dec. 14, 1948

2,456,095

UNITED STATES PATENT OFFICE 2,456,095

UREA-FORMALDEHYDE COMPOSITION

Henry A. Walter, Longmeadow, Mass., assignor to Libbey-Owens-Ford Glass Company, Toledo, Ohio, a corporation of Ohio No Drawing. Application November 6, 1947, Serial No. 784,524

4 Claims. (Cl. 260—17.3)

The invention relates to a thermosetting composition comprising a urea-formaldehyde reaction product and a novel latent curing catalyst.

When a thermosetting composition is shaped in a mold under pressure at an elevated temperature, it first softens and then hardens at the molding temperature, whereas a thermoplastic composition that is hot-molded remains soft until the molded piece is cooled. Thus an article can be molded from a thermosetting composition by simply placing the composition in a hot mold, closing the mold, and then removing the finished article after a relatively short time while the mold is still hot. The molding of an article from a thermoplastic composition presents a more complex problem, because an article molded from such a composition must be cooled before the mold is opened to prevent blistering and other deformation which would occur if the mold were opened while the thermoplastic material was still hot.

The length of time for which a molding composition must be left in the mold is one of the factors determining the cost of articles molded from the composition. A composition that must be left in the mold twice as long as another composition requires about twice as much molding equipment for the same volume of production, and hot-molding equipment is expensive.

A urea-formaldehyde reaction product is thermosetting in the presence of an acid substance in that it is "cured" or transformed by heat from a fusible composition into an infusible resin. In order to cause such transformation to take place, an acid substance must be present to act as a catalyst. In the molding of an article from a urea-formaldehyde composition, it is necessary to leave the composition in the hot mold for a short time after the mold has been closed in order to complete the transformation to the infusible resin so as to produce an article of optimum quality. The length of time for which it is necessary to leave a urea-formaldehyde composition in the mold varies with the degree of acidity produced by the acid substance used as a catalyst: the more acid the composition, the shorter the time required to complete the transformation to an infusible resin in the hot mold. There is, of course, a demand for urea-formaldehyde molding compositions that are completely converted into an infusible resin so that the finished article can be removed from the mold a relatively short time after the mold has been closed.

In spite of the advantage of acidity during the molding of a urea-formaldehyde composition, a urea-formaldehyde composition cannot be supplied in an acid condition by a manufacturer, because a urea-formaldehyde composition that is acid is unstable in storage. If it is acid, a urea-formaldehyde composition gradually becomes infusible at ordinary temperatures. Such a composition could not be sold by a manufacturer because it would be infusible and worthless by the time it reached the hands of a molder.

Even slight acidity which causes the composition to become infusible very gradually would make the composition commercially unacceptable, because the plasticity and other molding properties of such a composition would be wholly dependent upon the atmospheric temperature prevailing and the number of hours elasped between the production of the finished composition by the manufacturer and the molding of the composition by the user. A user who molds articles from a urea-formaldehyde composition must select a composition of the proper plasticity and test the composition by molding it under various conditions to determine the exact conditions required to give the desired results. In order to maintain the quality of the product, he must then continue to use a composition of exactly the same plasticity and to mold it under exactly the same conditions. If the composition used by the molder is unstable and has molding properties which vary with the length of time elapsed since the composition was produced, it is impossible for the molder to mold successive articles from the composition with satisfactory results.

A latent curing catalyst in a urea-formaldehyde composition is an ingredient that causes the transformation of the composition to an infusible resin in a hot mold, but does not materially impair the stability of the composition in storage at ordinary temperatures prior to hot molding. True latent curing catalysts are very rare. A latent curing catalyst may be alkaline neutral or so slightly acid that it does not appreciably acidify a urea-formaldehyde composition when added thereto. It is believed that such a substance breaks up or undergoes molecular rearrangement to form an acid, but does not do so until the molding temperature is reached. In order that such a substance may act as a curing catalyst, the acid so formed must be strong enough to cause the transformation of the urea-formaldehyde reaction product into an infusible resin.

A urea-formaldehyde molding composition contains an appreciable amount of moisture and frequently is kept in storage for weeks at a time before being used. Many substances that might be expected to decompose to form acids under molding conditions suffer the same decomposition within a few hours after being intimately mixed with a urea-formaldehyde composition, and therefore are not latent curing catalysts. Moreover, the behavior of a substance when present as a minor ingredient in a molding composition and subjected to molding pressure at the molding temperature of 270° to 330° F. cannot be predicted from its behavior when subjected by itself to such a temperature under atmospheric pressure. Most of the potentially acid substances that do not impair the stability of a molding composition when incorporated therewith fail to cause the transformation of the composition to an infusible resin in a hot mold.

Although certain halogenated organic compounds that liberate hydrobromic or hydrochloric acid when heated have been known to act as latent curing catalysts when incorporated in urea-formaldehyde molding compositions, substances that liberate organic acids are preferable to substances that liberate strong inorganic acids, because of the danger of mold corrosion by strong inorganic acids. Certain organic peroxides, such as benzoyl peroxide, have been used heretofore as latent curing catalysts, but there are many organic pigments useful in molding compositions that are deleteriously affected when a peroxide is present in the composition.

The principal object of the invention is to provide a thermosetting urea-formaldehyde composition containing a novel latent curing catalyst. More specific objects and advantages are apparent from the description, which discloses and illustrates the invention, and is not intended to impose limitations upon the claims.

A thermosetting composition embodying the invention comprises a urea-formaldehyde reaction product and a latent curing catalyst which is a sulfonate ester having the general formula

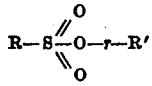

in which $r$ is a divalent unsubstituted aliphatic radical having from two to five carbon atoms and having at least one hydrogen atom attached to the same carbon atom as the oxygen linkage, in which the free valences are connected to different carbon atoms, and R and R' are monovalent radicals selected from the class consisting of phenyl, alkyl phenyl, and alkyl alkyl phenyl, said alkyl groups having from one to five carbon atoms. Such a latent curing catalyst is a sulfonate ester that undergoes thermal decomposition at molding temperature to liberate a sulfonic acid that is particularly well adapted to bring about rapid curing of a urea-formaldehyde reaction product. The thermal decomposition of such a sulfonate ester involves rupture of the molecule at the ester linkage, as follows:

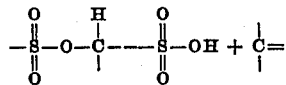

The hydrogen atom that becomes the acid hydrogen atom in the liberated sulfonic acid is pulled over or transferred from the carbon atom that is adjacent the oxygen atom forming the ester linkage.

Formation of a sulfonic acid does not take place if a hydrogen atom is not available on the carbon atom adjacent the oxygen linkage in a sulfonate ester, as in phenyl p-toluene sulfonate:

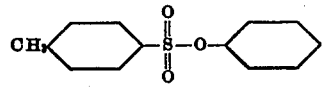

Therefore, the ability of a sulfonate ester to undergo the desired thermal decomposition depends upon the presence of a hydrogen atom attached to the carbon atom adjacent the oxygen linkage. On the other hand, certain other sulfonate esters having in the molecule a hydrogen atom attached to the carbon atom adjacent the oxygen linkage undergo thermal decomposition so readily that they are unstable at room temperature. For example, an ester of an aromatic sulfonic acid with an alpha-phenyl substituted alcohol, such as benzyl p-toluene sulfonate:

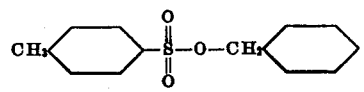

or phenyl methyl carbinyl p-toluene sulfonate:

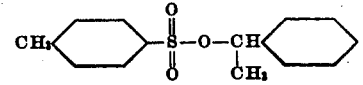

cannot be used as a latent curing catalyst because such a sulfonate ester is unstable at room temperature and liberates a sulfonic acid that converts a urea-formaldehyde reaction product to the infusible state during storage.

The present invention is based upon the discovery that although such esters of aromatic sulfonic acids with alpha-phenyl substituted alcohols are not latent accelerators, esters of aromatic sulfonic acids with certain other alcohols containing phenyl groups are latent accelerators. It now has been discovered that the thermal stability of these sulfonate esters is dependent upon the strength of the bond between the hydrogen atom and the carbon atom adjacent the oxygen atom in the ester linkage. In the aromatic sulfonates of alpha-phenyl substituted alcohols the bond is so weak that such sulfonates are unstable at room temperature, whereas it now has been found that in the aromatic sulfonates of certain other alcohols containing phenyl groups the bond is strong enough so that the ester is stable at room temperature, even though unstable at molding temperature. The latter aromatic sulfonates, in which such bond between the hydrogen atom and the carbon atom has the requisite strength, have the general formula

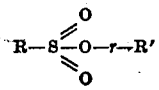

in which $r$ is a divalent unsubstituted aliphatic radical having from two to five carbon atoms and having at least one hydrogen atom attached to the same carbon atom as the oxygen linkage, in which the free valences are connected to different carbon atoms, and R and R' are monovalent radicals selected from the class consisting of phenyl, alkyl phenyl, and alkyl alkyl phenyl, said alkyl groups having from one to five carbon atoms. In the molecule of each such sulfonate the ester linkage and the phenyl group are connected to different carbon atoms in the divalent aliphatic radical. For example, such radical may be simply the dimethylene radical in a sulfonate ester such as beta-phenyl ethyl p-toluene sulfonate:

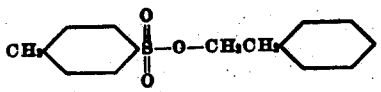

or it may be the isopropylene radical in a sulfonic ester such as benzyl methyl carbinyl p-toluene sulfonate:

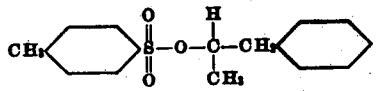

or it may be a butylene or an amylene radical.

Thus the latent curing catalyst in a thermosetting composition embodying the invention in an ester of an aromatic sulfonic acid such as benzene sulfonic acid, or an alkyl-substituted or alkyl alkyl-substituted benzene sulfonic acid, with a primary or secondary alcohol which has from two to five carbon atoms in the aliphatic residue and which is phenyl substituted or alkyl phenyl-substituted or alkyl alkyl phenyl-substituted at a carbon atom other than the hydroxy-substituted carbon atom, such as beta phenyl ethanol.

The latent curing catalyst may be an ester of such an alcohol, e. g., beta-phenyl ethanol, with benzene sulfonic acid, o-, m-, or p-toluene sulfonic acid, an o-, m-, or p-xylene sulfonic acid, such as o-xylene sulfonic acid-3, m-xylene sulfonic acid-5, or p-xylene sulfonic acid-2, any ethyl benzene sulfonic acid, such as 1-ethyl benzene sulfonic acid-4, any propyl benzene sulfonic acid, such as 1-propyl benzene sulfonic acid-2, any butyl benzene sulfonic acid, such as alpha-butyl benzene-eso-sulfonic acid or 1-sec. butyl benzene sulfonic acid-4, any amyl benzene sulfonic acid, such as isoamyl benzene-eso-sulfonic acid, or any alkyl alkyl benzene sulfonic acid in which one or both of the alkyl groups has from two to five carbon atoms.

The latent curing catalyst may be an ester of such a sulfonic acid, e. g., benzene sulfonic acid, with beta-phenyl ethanol, alpha-methyl beta-phenyl ethanol, beta-methyl beta-phenyl ethanol, alpha-ethyl beta-phenyl ethanol, beta-isopropyl beta-phenyl ethanol, or any other phenyl-substituted primary or secondary ethyl, propyl, butyl, or amyl alcohol in which the phenyl radical is connected to a carbon atom other than the hydroxy-substituted carbon atom.

In place of the phenyl radical, any of the foregoing alcohols with which the sulfonic acid is esterified may contain an o-, m- or p-tolyl radical, as in beta-p-tolyl ethanol, beta-o-tolyl ethanol or beta-p-tolyl propanol, or any xylenyl radical, as in beta-m-xylenyl alpha methtyl ethanol, or any ethyl phenyl radical, any propyl phenyl radical, any butyl phenyl radical, any amyl phenyl radical or any alkyl alkyl phenyl radical in which one or both of the alkyl groups contains from two to five carbon atoms.

A latent curing catalyst may be prepared by reacting any alcohol mentioned above with the sulfonyl chloride corresponding to any sulfonic acid mentioned above, in accordance with the conventional method of making aryl sulfonates, as follows:

After ten grams of the alcohol has been dissolved in 100 cc. of dry pyridine the solution is cooled to a temperature between zero and 5° C. in a bath of ice and salt. The solution is stirred during the dissolving of about 1.1 equivalents of the sulfonyl chloride and is then kept at about 0° C. for about two hours. About 10 cc. of water is then added to the solution in small proportions with vigorous stirring. The solution is kept at a tempearture of less than 10° C. and an additional 100 cc. of water is added. If the ester does not separate at this point it is extracted with chloroform and the chloroform solution is washed with an aqueous sodium bicarbonate solution to remove excess acid. In order to dehydrate the chloroform solution it is then thoroughly mixed with anhydrous sodium sulfate and filtered. After evaporation of the chloroform solution the product may be purified by recrystallization from ether or by vacuum distillation.

In the preparation of a reaction product of urea and formaldehyde for use in a composition embodying the invention, the urea may be reacted either with formaldehyde or with a polymer thereof, such as paraformaldehyde. Although under some conditions it is permissible to react dry urea with dry paraformaldehyde, the reaction preferably is carried out in an aqueous solution that is approximately neutral at the start of the reaction. Since commercial aqueous formaldehyde solution is strongly acid, a base preferably is added to bring the initial pH of the reaction solution to the desired value. Any desired base such as sodium or potassium hydroxide or any weaker base, or an organic base such as triethanol-amine may be employed. The preferred proportion of the reactants is three mols of formaldehyde for two mols of urea. Approximately two mols of formaldehyde are all that will react with each mol of urea, but an excess of formaldehyde above such maximum or a smaller proportion ranging down to about one mol of formaldehyde for each mol of urea may be used for the reaction if desired. Because of the complexity of the molecules of the reaction products that are produced, the proportion of formaldehyde actually reacting with the urea may vary freely between the limits stated. The reaction proceeds at ordinary temperatures, but heat may be used to shorten the time of reaction if desired. A reaction product may be prepared by carrying the reaction of the urea and formaldehyde only to its earliest stage, for example, the stage at which the urea and formaldehyde have just been brought into solution together, or the reaction may be carried to any further stage at which the reaction product is still fusible.

The preferred method of preparing a molding composition consists in preparing an aqueous solution of a urea-formaldehyde reaction product, impregnating cellulosic material with the solution, and then drying. Although alpha cellulose is the purest and lightest-colored cellulosic material that may be employed, any other cellulosic material such as wood flour, wood pulp, newsprint, printed newspapers, sawdust, shavings, walnut shell flour, or ground corn cobs may be used. The impregnated and dried cellulosic material preferably is ground to a fine powder in order to produce a homogeneous composition and the latent curing catalyst preferably is incorporated during the grinding stage. The customary modifiers such as hot-plate lubricants, opacifiers, pigments and other coloring matter may also be incorporated during the grinding. The fine powder so obtained may be formed into coarse granules, or into solid blanks or preforms of the proper sizes for use in various molds. Molded articles may be produced in the usual manner by compressing the composition in a closed mold under a pressure of one to four tons per square inch of projected area and at a temperature of 270° F. to 330° F. The proportion of cellulosic material in a dry composition embodying the invention preferably is from about 30 to about 40 per cent, but may range from 0 per cent to as much as 60 per cent in the case of a dense cellulosic material, such as walnut shell flour. The proportion of the latent curing catalyst employed is simply that proportion which causes the hardening to take place at the desired speed and may range from about 0.05 per cent of the composition to about 5 per cent of the composition.

Example

After alpha cellulose fiber (80 parts by weight) has been impregnated with an aqueous solution containing 120 parts of a urea-formaldehyde reaction product, the impregnated material is dried by any of the usual drying methods. Heat may be used as is customary to expedite the drying, and drying by means of a stream of air is convenient. The dried material is ground in a ball mill together with about .5 per cent of its weight of a latent curing catalyst prepared as described above, such as beta-phenyl ethyl p-toluene sulfonate, and any other desired modifiers. The resulting powder is useable as a molding composition for many applications but can be granulated or preformed.

Various compositions embodying the invention may be prepared to meet various requirements.

This is a continuation-in-part of application Serial No. 483,346, filed April 16, 1943, and application Serial No. 579,893, filed February 26, 1945 both of which applications are now abandoned.

Having described my invention, I claim:

1. A thermosetting composition comprising a urea-formaldehyde reaction product and a latent curing catalyst having the general formula

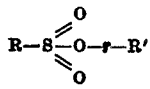

in which r is a divalent unsubstituted aliphatic radical having from two to five carbon atoms and having at least one hydrogen atom attached to the same carbon atom as the oxygen linkage, in which the free valences are connected to different carbon atoms, and R and R' are monovalent radicals selected from the class consisting of phenyl, alkyl phenyl, and alkyl alkyl phenyl, said alkyl groups having from one to five carbon atoms.

2. A thermosetting composition comprising a urea-formaldehyde reaction product, a cellulose filler, and a latent curing catalyst having the general formula

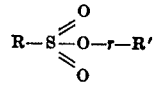

in which r is a divalent unsubstituted aliphatic radical having from two to five carbon atoms and having at least one hydrogen atom attached to the same carbon atom as the oxygen linkage, in which the free valences are connected to different carbon atoms, and R and R' are monovalent radicals selected from the class consisting of phenyl, alkyl phenyl, and alkyl alkyl phenyl, said alkyl groups having from one to five carbon atoms.

3. A thermosetting composition comprising a urea-formaldehyde reaction product and beta-phenyl ethyl p-toluene sulfonate as a latent curing catalyst.

4. A thermosetting composition comprising a urea-formaldehyde reaction product and an amount of beta-phenyl ethyl p-toluene sulfonate equal to about one-half of one per cent of the weight of the composition as a latent curing catalyst.

HENRY A. WALTER.

No references cited.

Certificate of Correction

Patent No. 2,456,095.                                December 14, 1948.

HENRY A. WALTER

It is hereby certified that errors appear in the printed specification of the above numbered patent requiring correction as follows:

Column 5, line 16, for the words "invention in" read *invention is*; line 58, for "methtyl" read *methyl*;

and that the said Letters Patent should be read with these corrections therein that the same may conform to the record of the case in the Patent Office.

Signed and sealed this 21st day of June, A. D. 1949.

[SEAL]

THOMAS F. MURPHY,
*Assistant Commissioner of Patents.*